(12) United States Patent
Sharbono et al.

(10) Patent No.: US 9,802,655 B2
(45) Date of Patent: Oct. 31, 2017

(54) E-MEDIC POLY AMBULANCE

(71) Applicant: E-Medic PolyBilt Ambulance, LLC, Ocala, FL (US)

(72) Inventors: Branden Sharbono, Ocala, FL (US); Victor Giraldo Ruiz Caro Rothgiesser, Lima (PE)

(73) Assignee: E-Medic Polybuilt Ambulance Inc., Ocala, FL (US)

( * ) Notice: Subject to any disclaimer, the term of this patent is extended or adjusted under 35 U.S.C. 154(b) by 0 days.

(21) Appl. No.: 14/968,232

(22) Filed: Dec. 14, 2015

(65) Prior Publication Data
US 2017/0166262 A1    Jun. 15, 2017

(51) Int. Cl.
  *B61G 3/00*  (2006.01)
  *B62D 29/04*  (2006.01)
  *A61G 3/00*  (2006.01)

(52) U.S. Cl.
  CPC ............. *B62D 29/043* (2013.01); *A61G 3/00* (2013.01)

(58) Field of Classification Search
  CPC .. A61G 1/0262; A61G 1/0212; A61G 1/0567; A61G 1/0237; A61G 1/0293; A61G 3/001; A61G 1/04; B60Q 1/2611
  USPC ..................................... 296/19, 20; 180/89.1
  See application file for complete search history.

(56) References Cited

U.S. PATENT DOCUMENTS

| | | | | |
|---|---|---|---|---|
| 4,251,100 A | * | 2/1981 | Rolandelli | A61G 3/003 280/801.1 |
| 4,339,147 A | * | 7/1982 | Kimzey | B60P 3/04 119/415 |
| 4,458,864 A | * | 7/1984 | Colombo | A61G 3/001 244/118.5 |
| 4,672,296 A | * | 6/1987 | Griffin | H02J 9/066 290/4 R |
| 4,677,896 A | * | 7/1987 | Litvinoff | A61G 3/00 296/187.07 |
| 4,712,822 A | * | 12/1987 | Janos | B60P 3/14 248/352 |
| 5,178,432 A | * | 1/1993 | Zeman | A61G 3/006 280/790 |
| 5,236,390 A | * | 8/1993 | Young | B60P 3/14 296/19 |
| 5,615,848 A | * | 4/1997 | Ceriani | B64D 9/00 244/118.5 |
| 5,779,296 A | * | 7/1998 | Hewko | A61G 1/06 244/118.6 |
| 6,082,799 A | * | 7/2000 | Marek | A61G 3/001 296/19 |
| 7,182,396 B2 | * | 2/2007 | Taylor | B60P 3/14 296/181.1 |
| 7,530,403 B2 | * | 5/2009 | Cano | A62C 27/00 169/24 |

(Continued)

*Primary Examiner* — Kiran B Patel

(57) ABSTRACT

A poly bilt ambulance compartment for attachment to a vehicle for providing patient transport and treatment in a manner that will accommodate medical personnel and at least one patient located on a mobile cot in a position such that the medical personnel can provide medical care and assistance including intensive life support services during transit. The poly structure is built to house and store medical supplies and treatment equipment, which can be used in a variety of environments and be easily cleaned following patient delivery, and is formed from sanitized, non-porous material that will minimize bio-hazard conditions.

12 Claims, 11 Drawing Sheets

(56) References Cited

U.S. PATENT DOCUMENTS

| | | | | |
|---|---|---|---|---|
| 7,621,705 | B2* | 11/2009 | Hillberry | A61G 1/06 267/259 |
| 8,007,351 | B1* | 8/2011 | Maloney | A61G 10/005 454/187 |
| 8,205,703 | B2* | 6/2012 | Halliday | F41H 7/048 180/89.1 |
| 8,888,495 | B2* | 11/2014 | Johnson | G09B 5/06 434/219 |
| 9,022,263 | B1* | 5/2015 | Russell | A61G 3/0858 224/281 |
| 9,186,288 | B2* | 11/2015 | Sartin | A61G 3/0825 |
| 2004/0265084 | A1* | 12/2004 | Hillberry | A61G 1/06 410/66 |
| 2008/0036232 | A1* | 2/2008 | Randjelovic | B60N 2/0735 296/65.13 |
| 2011/0115245 | A1* | 5/2011 | Engelbrecht | A61G 1/02 296/19 |
| 2011/0260482 | A1* | 10/2011 | Bourgraf | A61G 3/00 296/19 |
| 2012/0006873 | A1* | 1/2012 | Chinn | A61G 3/0841 224/545 |
| 2013/0062909 | A1* | 3/2013 | Harris | B62D 33/0273 296/182.1 |
| 2015/0251592 | A1* | 9/2015 | Fisher | B60Q 1/2611 362/548 |
| 2015/0310781 | A1* | 10/2015 | Fisher | G09F 21/04 40/592 |

* cited by examiner

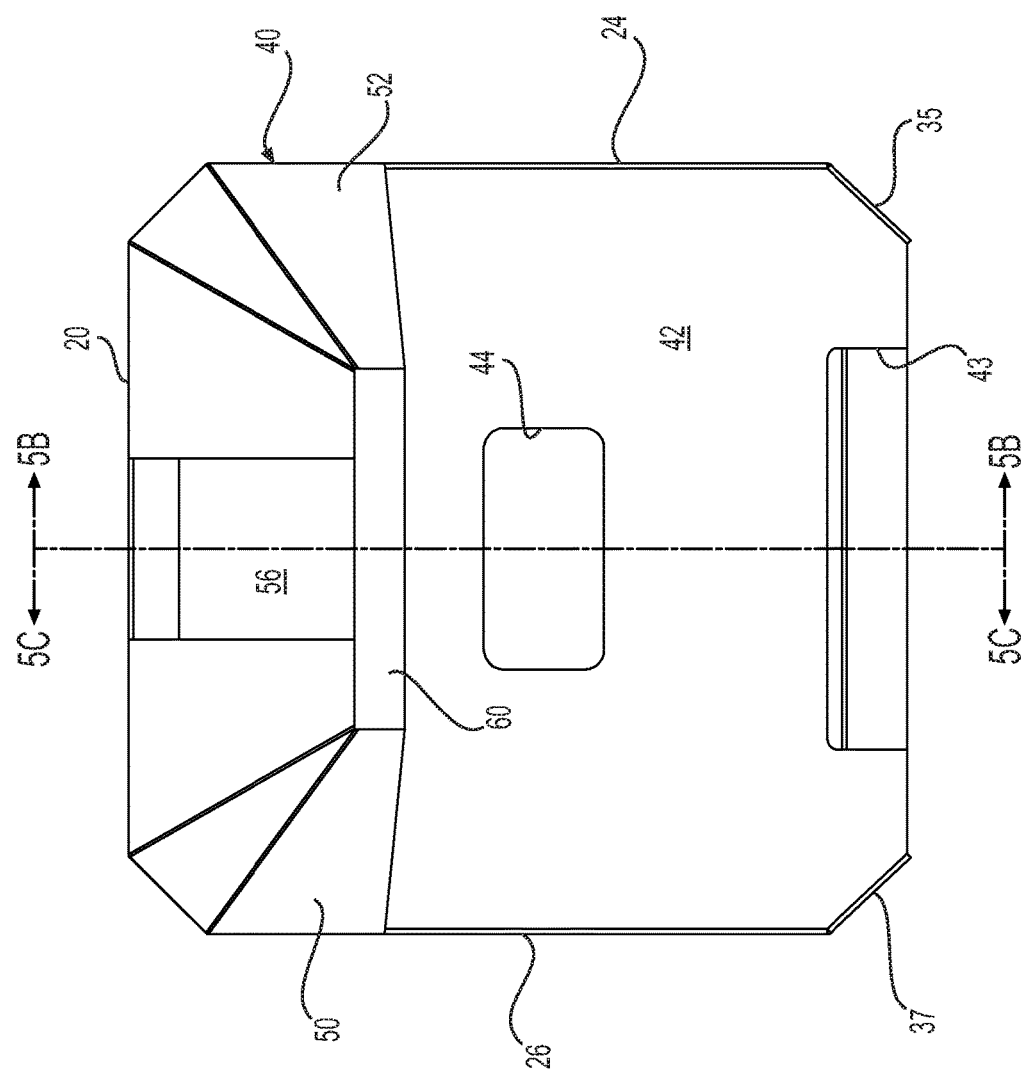

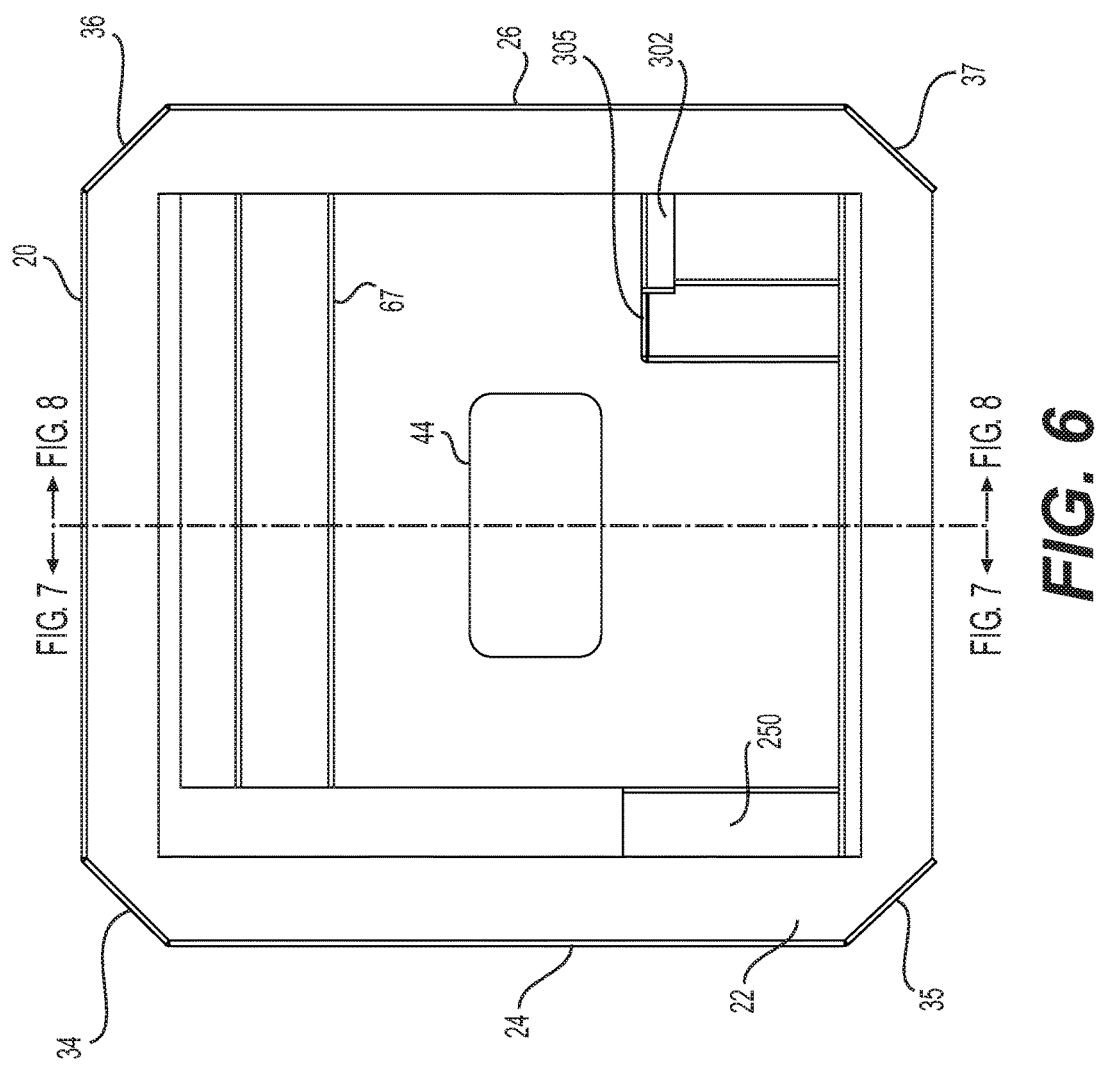

E-MEDIC POLY AMBULANCE

COPYRIGHT NOTICE

A portion of the disclosure of this patent document contains material which is subject to copyright or mask work protection. The copyright or mask work owner has no objection to the facsimile reproduction by anyone of the patent document or the patent disclosure, as it appears in the Patent and Trademark Office patent file or records, but otherwise reserves all copyright or mask work rights whatsoever.

CROSS-REFERENCE TO COMMONLY OWNED PATENTS

The present invention is related to the following U.S. Patents which are commonly owned with the present application, the entire contents of each being hereby incorporated herein by reference thereto: (1) U.S. Pat. No. 5,979,686, entitled "Liquid Storage Tank"; (2) U.S. Pat. No. 6,394,534, entitled "Poly-Bilt Truck"; and (3) U.S. Pat. No. 5,820,718 entitled Liquid Storage Tank, all of which are incorporated herein by reference thereto, in their entirety as if the entire disclosure of each was written herein. The technical descriptions contained in the foregoing patents concerning polyprene will not be included herein for the sake of brevity.

FIELD OF THE DISCLOSURE

This disclosure relates to the construction and design of a unitized container that can be attached to a truck chassis and serve as an ambulance compartment.

INTRODUCTION

One of the problems with ambulances today is that the ambulance patient structure or compartment is formed from a combination of materials including an extensive internal frame, an aluminum skin welded or otherwise attached to that internal frame, a floor mounted within the frame, use of interior parts formed from wood and vacuum formed plastic parts, with many joints and different surfaces. That grouping of structures and materials makes the patient structure difficult to manufacture and heavy. Such an interior structure is also difficult to clean. Cleaning is important following transport of a patient and the need for cleaning can be quite varied. This depends upon not only the last patient that has been transported, but the environment where the ambulance is being used, and the conditions during use, including weather, military, natural disasters, flooding situations, and so on. To provide the safest and cleanest transport conditions for patients requires that the interior of the ambulance be cleaned thoroughly after each patient has been delivered to a desired location. Sometimes there can be some time between uses while at other times the ambulance must be quickly put back into service. In such situations the ease by which cleaning can occur is paramount.

The material being used in the present invention is polyprene. This material is utilized for the construction of the ambulance compartment hereinafter described. Polyprene is lightweight, resistant to chemicals, impact resistant and serves as soundproofing, it is completely non-porous, and a corrosion resistant material making it highly suitable for ambulance construction. This is especially true as biohazard materials, bodily fluids, blood and other medical and recovery contaminants can be present and will require removal by cleaning following patient transfer. Since the entire body construction is manufactured with polyprene material, the interior will be quieter, surfaces can be repaired easily, and all interior surfaces can be completely sanitized allowing for a safer work station for both the emergency responders as well as the patient.

Further, Polyprene, in the form of sheets, permits a fabrication process that will cut precise shapes and configurations from the sheets to be then used in constructing each of the panels forming the ambulance compartment. As a consequence the exterior and interior surfaces of the ambulance will be made from the same Polyprene material. When fabricating the ambulance compartment the shaped sheets and panels will be joined together using thermoplastic welding techniques to form an exterior and an interior structure that is an integral unit including the interior seats, benches, and cabinets, that and collectively produce a high strength unibody construction, which eliminates the need for underlying materials and reduces the need for interior support frames. The present construction also eliminates a large number of otherwise required joints and construction steps necessary in manufacturing traditional ambulance structures which includes a combination of metal, wood, plastic and many layers of materials to form the ambulance body structure.

Polyprene material also exhibits superb impact resistance due to unique combination of strength and flexibility thereby eliminating shock transfer through the body in the event of high speed collision, which keeps damage to a minimum. The Polyprene material also exhibits excellent heat resistant characteristics that will not begin to deform until a constant 300 to 400 degrees is applied to the material for requisite time. Consequently, should the ambulance be used in a fire situation, the vehicle paint will ignite; the tires will melt and the acrylic and ABS materials incorporated into the chassis will melt before the ambulance compartment itself is materially affected.

DESCRIPTION OF PRESENTLY PREFERRED EXAMPLES OF THE INVENTION

Brief Description of Figures

The invention is better understood by reading the following detailed description with reference to the accompanying drawings in which:

FIG. 5A is a front elevational view of the ambulance compartment;

FIG. 6 a rear elevational view of the poly compartment structure;

DETAILED DESCRIPTION

A. Overview

Figure 1:
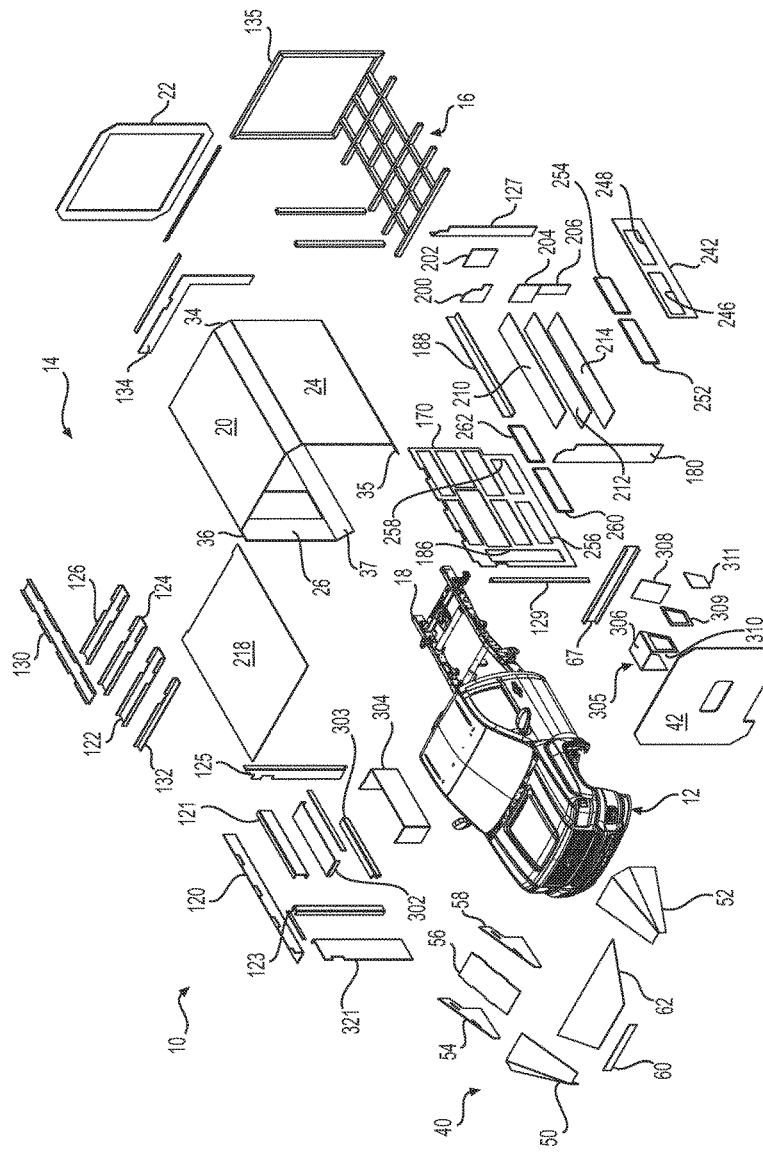
FIG. 1 is an exploded view of a poly-bilt ambulance.

To gain a better understanding of the invention, a preferred embodiment will now be described in detail. Frequent reference will be made to the drawings. Reference numerals or letters will be used throughout to indicate certain parts or locations in the drawings. The same reference numerals or letters will be used to indicate the same parts and locations throughout the drawings, unless otherwise indicated.

B. Environment

The preferred embodiment now described will be with respect to a rear compartment of an ambulance comprised of a compartment structure formed from poly sheeting and comprising a front wall, opposing side walls, a roof member, a floor member, and a rear wall, all collectively adhered together forming a unitized and interconnected copolymer structure. The use of the poly sheets, that are themselves precisely cut to a desired size and shape are welded or glued together, thereby creating a unibody ambulance compartment structure that will eliminate a large number of otherwise required joints and construction steps. The scale of the embodiment, therefore, is to be understood with respect to this type of article. It is to be understood as well, however, that the invention is applicable to other articles and its scale can vary accordingly.

C. Structure

FIGS. 1-3, 5A, 6 and 9 shows an ambulance 10 comprised of a truck 12 and a poly-bilt patient compartment structure 14 having a bottom frame 16 that is suitably attached to a rear chassis 18 portion of truck 12.

The poly-bilt patient compartment structure 14 is formed from sheets of polymer and has an exterior structure comprised of a roof 20, a rear wall 22, and side-walls 24 and 26. The rear wall 22 includes doors 28 and 30 each being attached by continuous piano hinges 32, but the rear door could as well be a single door attached by similar hinges, which could open from either the right or left side. The roof structure 20 can also include beveled side edges 34 and 36 extending from the front to the rear. A wind deflector 40, also formed from polyprene, is a separate structure attached to a front wall 42 that can also include a window 44 which can be accessed from or visually connected to the truck cab's interior.

The wind deflector 40 is formed from a plurality of individual parts including outer corners 50 and 52, a bottom sheet 62, a center sheet or section 56 that can be recessed and with angled sides 54 and 58. A cross beam 67 and an upper cross beam 69 can be provided on the interior of front wall 42 to provide support for wind deflector 40 and for mounting seat belting assemblies, a wiring channel and an oxygen channel There is also a drainage tube 129 for the air conditioning condensation that can be positioned on the interior of front wall 42.

Figure 4:
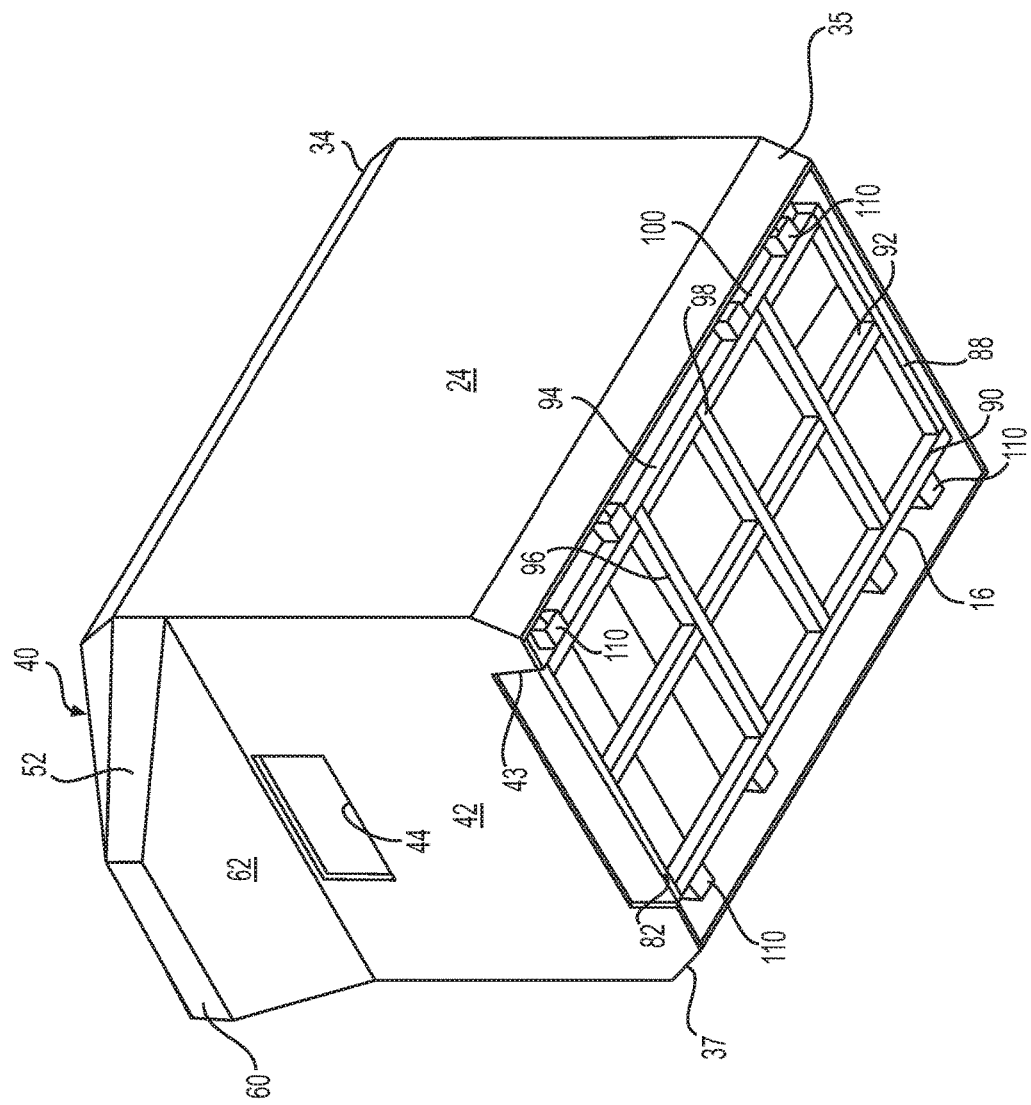
FIG. 4 is a bottom perspective showing a bottom frame.
Figure 9:
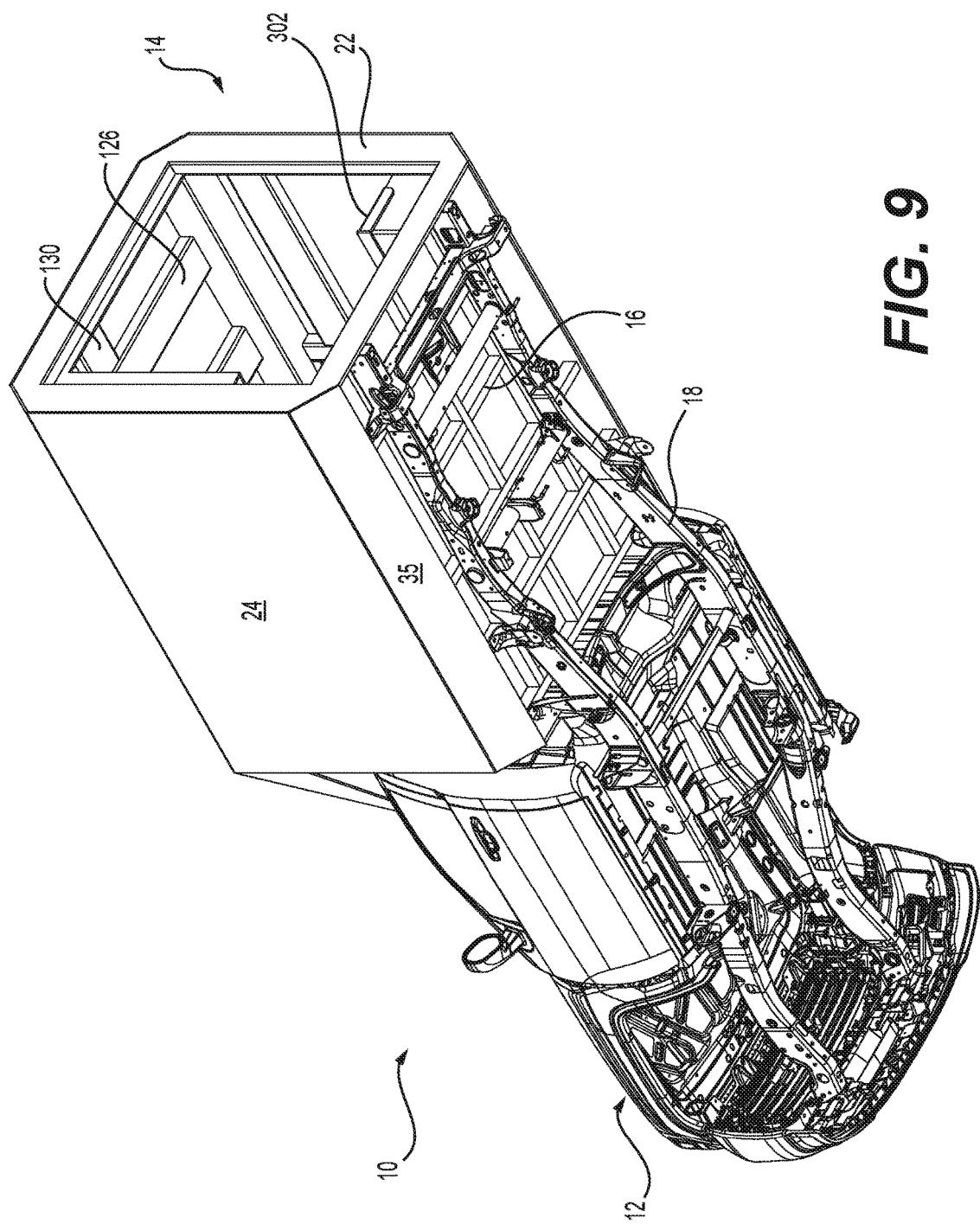
FIG. 9 is a bottom perspective of the ambulance and truck frame.

The bottom frame 16 is shown in greater detail in FIGS. 4 and 9 as including a front rail 82, a rear rail 88, a plurality of front-to-rear rails is shown at 90-94, and a plurality of cross rails 96-100. These rails forming bottom frame 16 are preferably welded together and are made from drawn or extruded aluminum tubing structures. However, it should be understood that other framing structures could be used, for example, in the form of small I-beams, box beams made from other metals, composites, carbon fiber or other synthetic material, or other shaped support members or beams that have been extruded, cast or drawn. Bottom frame 16 will also include a plurality of connectors 110 that will provide connection points to the vehicle chassis 18 as in FIG. 9. The design of the bottom frame can be changed depending on size of the ambulance body, the desired chassis clearance and mounting requirements, the positioning of interior ambulance components that require mounting, and the connections to other supporting and strengthening members like the rear frame 135.

Figure 2:
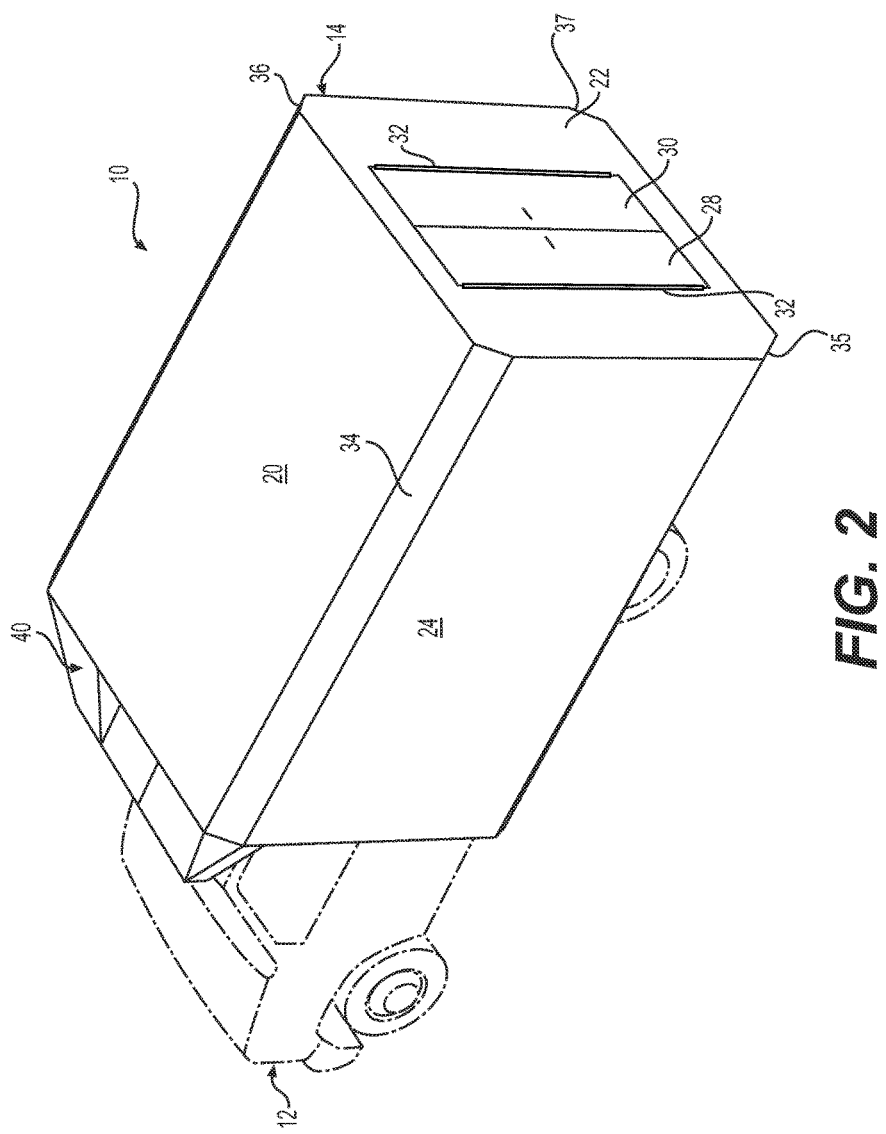
FIG. 2 is a rear perspective of an ambulance with the poly-bilt rear compartment structure attached to a vehicle.
Figure 3:
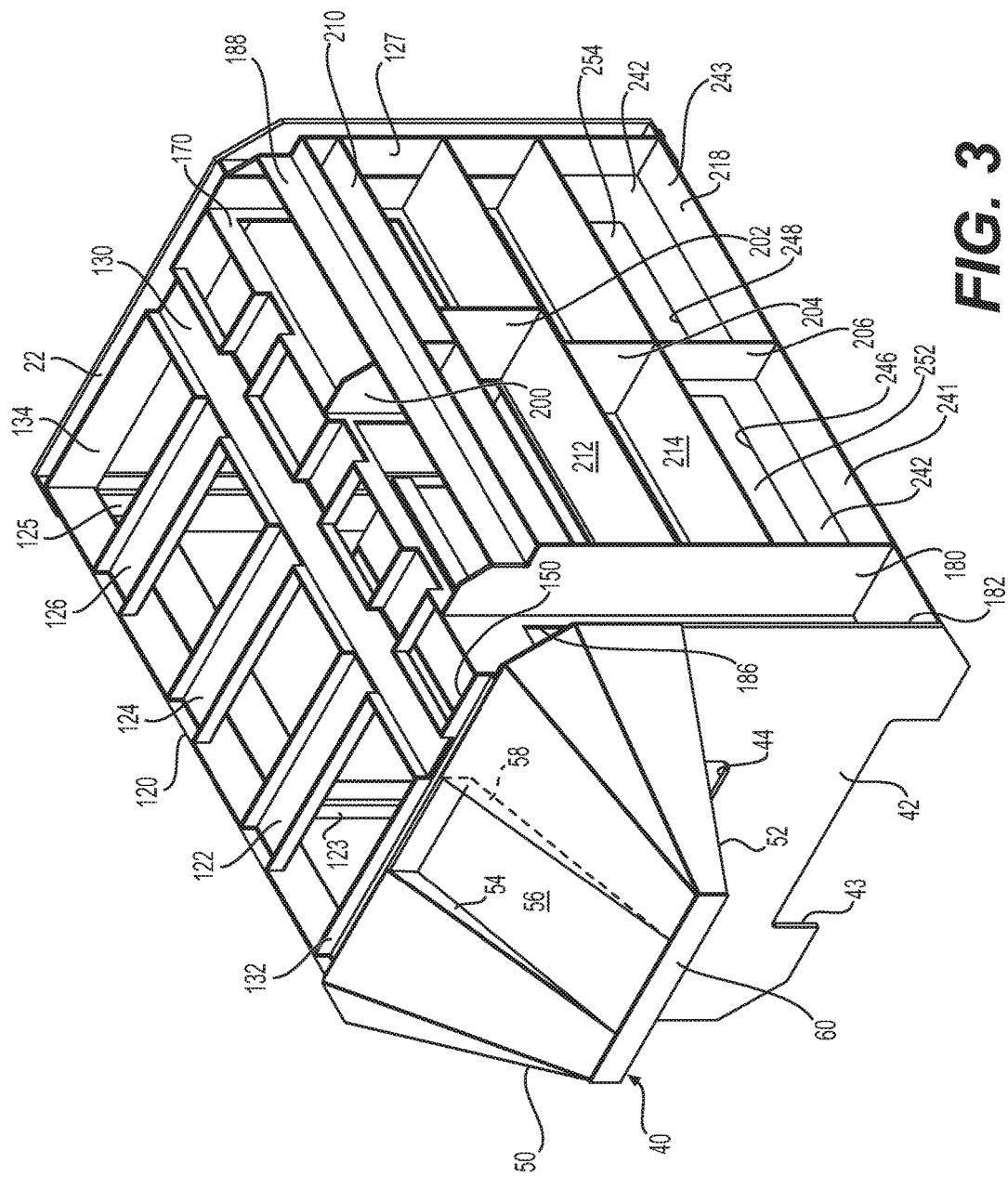
FIG. 3 is a perspective view of the poly compartment structure with portions removed for clarity.

The internal structure of the poly-bilt patient compartment is shown in FIGS. 1-3. Looking from the side 26, the top portion is formed from an upper side rail 120 that will interconnect between the front wall 42 and rear wall 22. Side rail 120 is welded to a series of U-shaped channel members 122, 124 and 126 extend cross wise between side rail 120 and an opposing panel 170 that also serves as the face plate for equipment shelves. A U-shaped center beam 130 that is itself connected at opposing ends to rear wall 22 and front wall 42 also interconnects with channel members 122-126. The U-shaped channel members 122-126 and 130 also provide roof stiffening. The right side can also include a series of vertically extending support members, two of which are shown at 123 and 125, which will collectively aid in supporting side rail 120 along its length and along its mid-portion. Support 125 is at one rear corner and another vertical member or support is 127, and both supports 125/127 lie adjacent a rear frame 135 that is positioned between rear wall 22 and 134.

The U-shaped center beam 130 can further include light holes to provide light into the interior of the ambulance compartment above the patient or stretcher. Light holes could also be provided on or in the U-shaped channel members 122-126, and these same channel members can also provide hand rail mounts for paramedic use.

Figure 5B:
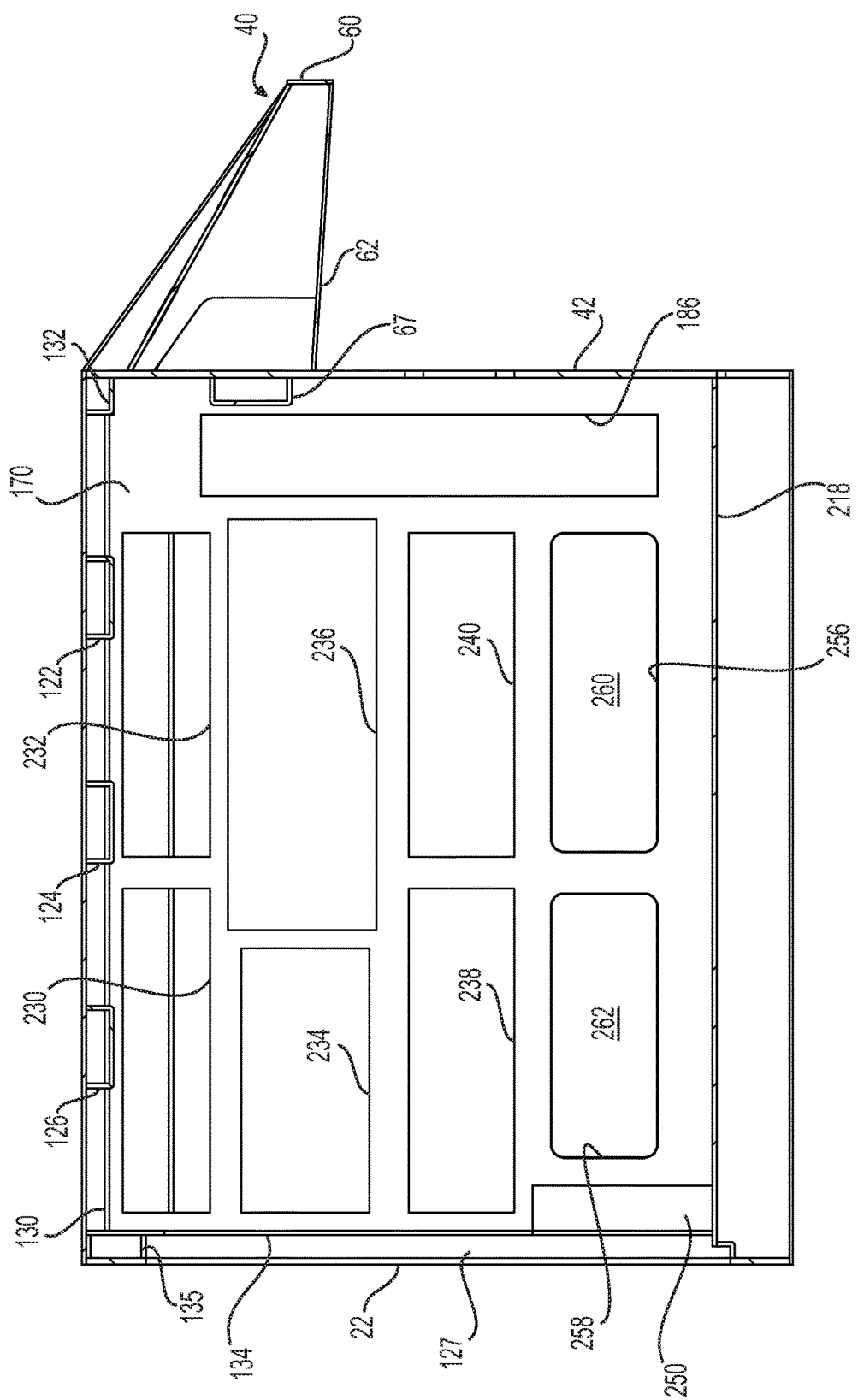
FIG. 5B is a cross sectional view taken along line 5B-5B in FIG. 5A.
Figure 7:
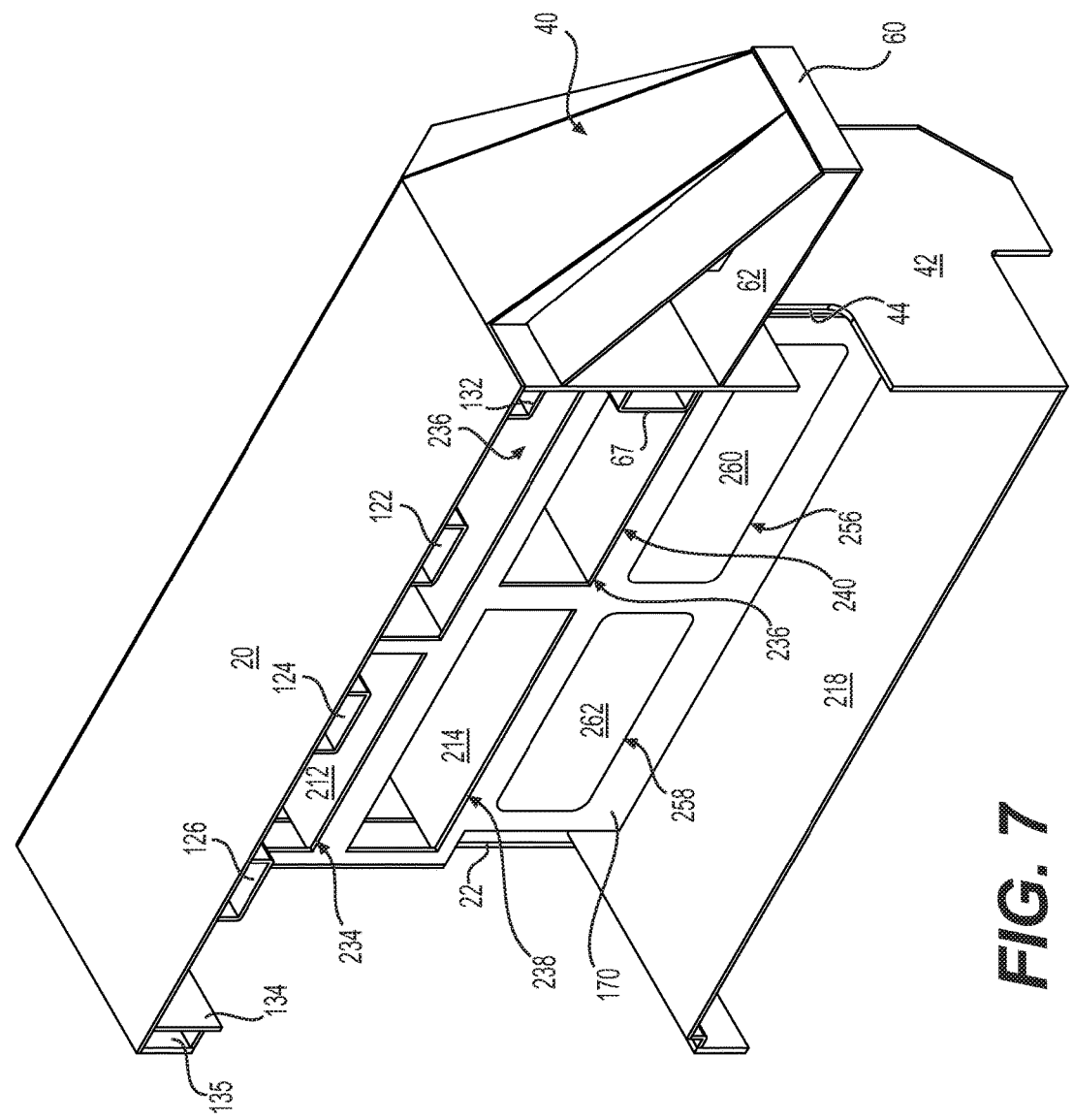
FIG. 7 is a cross sectional view taken along line 7-7 in FIG. 6.

The right side, as shown in FIGS. 3, 5B and 7 includes a series of cabinets for storing various supplies and are formed from a front face plate 170, a vertical support 180 that is spaced from front wall 42 to form a vertical compartment 182, for example for storing or housing oxygen bottles. The face plate 170 includes an opening 186 for a door onto compartment 182. An upper L-shaped member 188 extends rearwardly from vertical support 180 to the rear vertical member 127 adjacent rear wall 22. A series of additional vertical shelf support members are shown at 200-206, located in a middle section of the left side, which together with vertical supports 180 and 127 support a series of horizontally extending shelves 210, 212 and 214 that, along with a portion of floor 218, collectively form a series of compartments 230-240, 241 and 243 as shown in FIGS. 3, 5B and 7. The bottom two compartments, 241 and 243 include a divider wall 242 that can having openings 246 and 248, that are closed by panels 252 and 254, respectively, and face plate 170 has bottom openings 256 and 258 that are closed by panels 260 and 262, respectively. The bottom of the divided bottom compartments 241 and 243 is provided by a portion of floor 218. The upper compartments 230-240 can be provided with hinged doors not shown. It should be understood, however, that other door or compartment configurations and closing arrangements can be used, including sliding doors, with the foregoing being exemplary. Interior walls that have cut outs will permit retrieval of medial supplies yet keep those supplies from falling out of their compartments. An opening formed from the rear, as shown in FIG. 6 at 250 can be for backboard storage. The openings formed in panel 170 and divider wall 242, also can be closed with any such closed storage compartment(s) also providing a place for electrical or other equipment and the truck or paramedic personnel. Further, the compartments can also be provided with holes along bottom edges to permit cleaning fluid to escape and to ease cleaning.

Figure 5C:
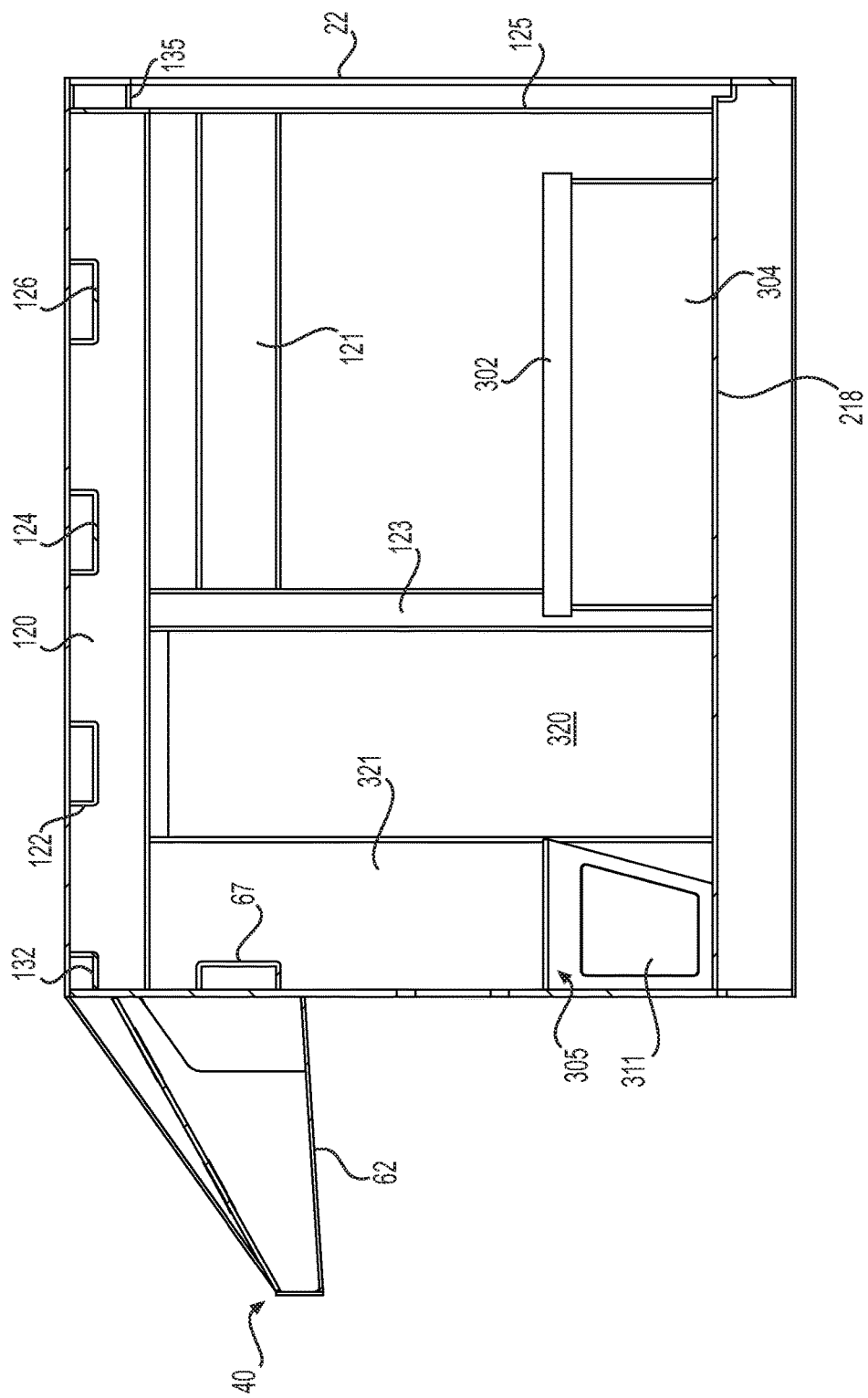
FIG. 5C is a cross sectional view taken along line 5C-5C in FIG. 5A.
Figure 8:
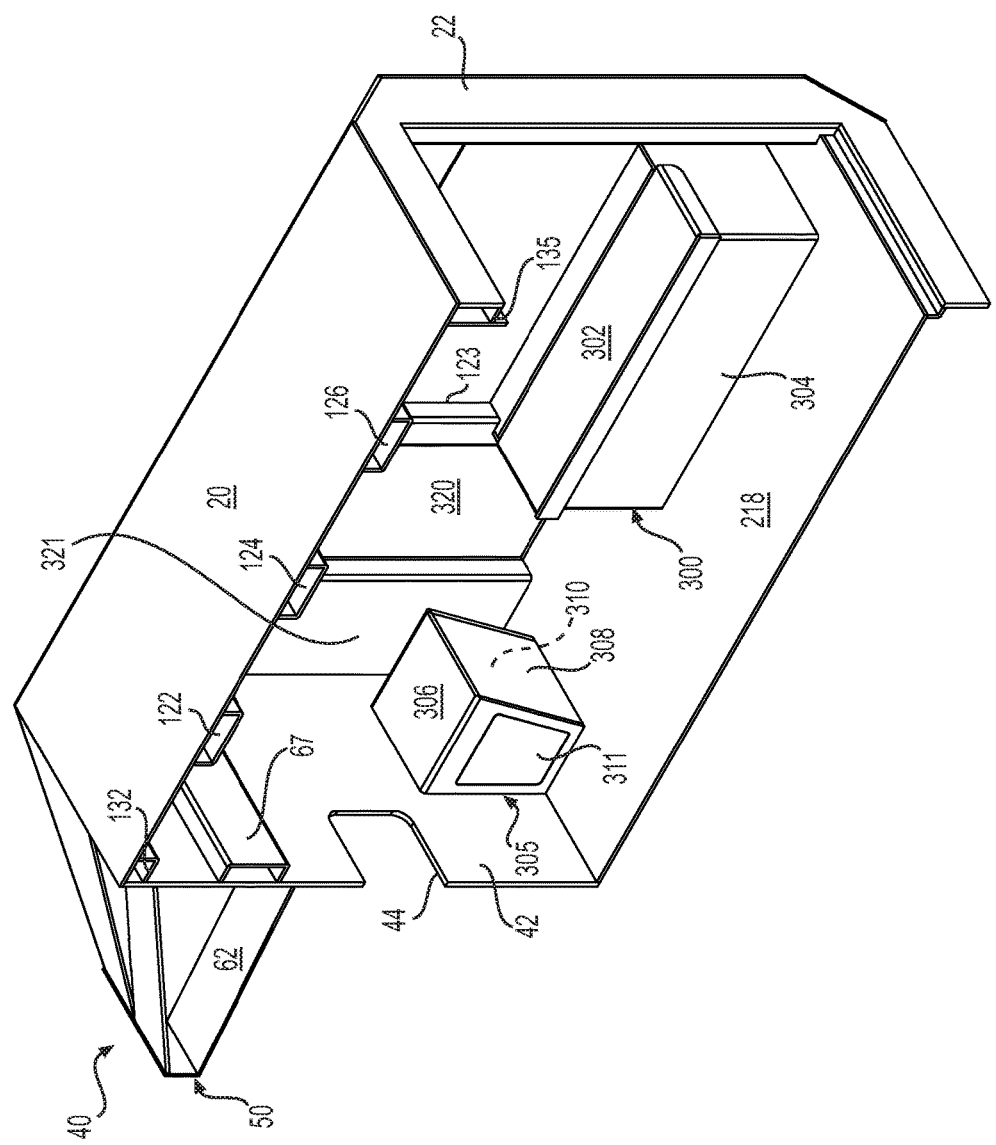
FIG. 8 is a cross sectional view taken along line 8-8 in FIG. 6.

Turning now to FIGS. 5C and 8, this is looking at the medical personnel side of the ambulance interior and shows a paramedic bench 300 formed from poly material and integrally formed with or against an interior wall 26 and can be a closed structure with a front wall 304 with a hinged lid 302. A chair 305 is also integrally formed adjacent a corner of interior walls 26 and 42. Chair 305 is formed from poly material with a seat 306 and a support 308 having a hollow interior 310 for storage of supplies with a hinged door 311 that is supported by a door sill 309. A second or side door 320 is also provided on side wall 26 and is supported between supports or door posts 321 and 123.

An interior floor 218 is shown throughout the various views. Also, suitable wiring for electrical outlets, for lighting, for equipment and like components, can be provided in various of the U-shaped channel members and electrical access can be obtained via the panels forming the compartment or compartments 230-240 where electrical equipment might be installed. It should also be understood that conduits or channels for oxygen or other medical gasses can be supplied via tubing that might be housed as well in one or more of the U-shaped channel members or the vertical supports as is desired or practical.

From a review of the above-described embodiments, one can see that the copolymer material of the present poly-bilt patient compartment structure can provide for increased utility, corrosion resistance, and high impact resistance compared to standard ambulance bodies, the use of light weight materials without sacrificing strength or load testing requirements, the ability to form integral cabinets to the skin of the ambulance, the elimination of crevices, a consolidation of materials to one material for the poly-bilt patient compartment and ambulance structure, use of completely sanitized and non-porous material providing for the elimination of bio hazard issues, a bright interior for the poly-bilt patient compartment, and a patient ambulance that is easily cleaned.

The copolymer fabrication in welding design also provides design flexibility such that customized poly-bilt patient compartment structure bodies can be easily accommodated in the manufacturing process. When painted, the copolymer material appears no different than standard ambulance bodies.

Although not specifically limited to such, the example embodiments above described employ polyprene copolymer formulated from sheet stock material ⅜ inches to ¾ inches thick. The polyprene is 100% virgin grade, made from Aristech resin, such as, for example TI-4007-L resin. This resin is made up of a combination of ethylene and propylene polymers. Although other copolymers may be envisioned as acceptable alternatives, the above described material is well suited for truck bodies since it is strong and yet flexible enough to resist cracking and fatigue due to constant movement. The polyprene example copolymer can be painted and repaired if damaged. It also does not rust, corrode, crack, chip or peel under traditional ambulance usage. The copolymer is impervious to microbial attack from, for example, the stored water, patient fluids, chemicals, medical wastes, drugs or other aspects of patient care or transport. Although polyethylene and polypropylene may provide alternative copolymer materials, polyprene is substantially stronger at high and low temperature applications, and is thus preferred.

Because the poly-bilt patient compartment structures of the present invention are formed of the copolymer material, custom and pre-engineered designs can be easily accommodated using auto CAD technologies. The location of bent edge corners, fusion weldings, extrusion weldings, and thermoplastic fabrication processes may be incorporated into the poly-bilt patient compartment structure in accordance with strategic strength requirements of ambulance vehicles.

To qualify as an ambulance it is required that the patient transport compartment must meet structural integrity requirements. One standard is described in a document titled AMD Standards, published in 2007 by the Ambulance Manufactures Division of the National Truck Equipment Association (NTEA), which is hereby incorporated herein, in its entirety as if the entire disclosure was written herein, by reference thereto. This AMD Standard requires that an ambulance compartment pass specific static loading testing, which for Type II bodies requires that the ambulance body must withstand a force equal to 1.5 times the curb weight of the vehicle, and for Type I and III bodies the ambulance body must withstand a force equal to 2.5 times the curb weight of the vehicle. (See, Standard 001, section S5). Consequently, the floor member, the roof member, the opposing side walls, the rear and the front walls, will be suitably reinforced by use of an internal frame, so that the poly bilt structure collective have a static strength to resist forces equal to a 2.5 times curb weight as noted above to pass the required static loading tests.

The polyprene sheets can be welded together to form the compartment 14 and the welding techniques can be those set forth and described in the above referenced U.S. Pat. No. 5,820,718. The welding can be achieved by using hot air welding equipment and either hand welds or extrusion welds can be made to joint sheets of polyprene together. Temperatures for hand welding or tack welding can be from 375-425° C. and the joints can include a V or double V groove, they can be in the form of a butt joint, or other known forms, and the welding process uses a rod of material that will be melted into place. Welding by hand can proceed at a rate of 12 inches per minute. Temperatures for extrusion welding can begin with preheating the joint area at 275° C. and thereafter welding can proceed at a rate of 36 inches per minute at a temperature of about 220° C.

When introducing elements of various aspects of the present invention or embodiments thereof, the articles "a," "an," "the" and "said" are intended to mean that there are one or more of the elements, unless stated otherwise. The terms "comprising," "including" and "having," and their derivatives, are intended to be open-ended terms that specify the presence of the stated features, elements, components, groups, and/or steps, but do not exclude the presence of other unstated features, elements, components, groups, and/or steps and mean that there may be additional features, elements, components, groups, and/or steps other than those listed. Moreover, the use of "top" and "bottom," "front" and "rear," "above," and "below" and variations thereof and other terms of orientation are made for convenience, but does not require any particular orientation of the components. The terms of degree such as "substantially," "about" and "approximate," and any derivatives, as used herein mean a reasonable amount of deviation of the modified term such that the end result is not significantly changed. For example, these terms can be construed as including a deviation of at least +/−5% of the modified term if this deviation would not negate the meaning of the word it modifies.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A copolymer ambulance housing for use on a vehicle chassis, the copolymer ambulance housing comprising: a compartment structure formed from poly sheeting and comprising a front wall, opposing side walls, a roof member, a floor member, and a rear wall, all collectively adhered together forming a unitized and interconnected copolymer structure; a mounting assembly attached to and forming a portion of an underside of the compartment structure connectable to the vehicle chassis; a multi-compartment interior assembly mounted directly to an inside surface of at least one of the opposing side walls; paramedic seating integrally formed with an inside surface of the compartment structure opposite the multi-compartment assembly; the floor member, the roof member, the opposing side walls, the rear wall, the front wall, and any internal framing having a collective static strength to at least meet ambulance testing requirements.

2. The copolymer ambulance housing as in claim 1 wherein the compartment structure is reinforced by use of an internal frame mounted thereto.

3. The copolymer ambulance housing as in claim 1 wherein paramedic seating is interconnected with the other of the opposing side walls and a portion of the floor member.

4. The copolymer ambulance housing as in claim 1 wherein the compartment structure and the multi-compartment interior assembly are formed from a corrosion, bacteria, virus and pathogen free material.

5. The copolymer ambulance housing as in claim 1 wherein the compartment structure is formed from poly sheets cut to a desired shape and size, and joints between poly sheets are formed without underlying support frames.

6. The copolymer ambulance housing as in claim 1 wherein the front wall, the opposing side walls, the roof member, the floor member, and the rear wall are formed from poly sheets that are themselves secured together to create a unibody ambulance compartment structure.

7. The copolymer ambulance housing as in claim 1 wherein the interconnected ambulance compartment and the multi-compartment interior assembly and the paramedic seating structure collectively form an integral high strength composite structure.

8. The copolymer ambulance housing as in claim 1 wherein the poly material comprises a highly heat resistance material that will not begin to deform until heated to a temperature ranging between 300 to 400 degrees.

9. The copolymer ambulance housing of claim 1 wherein the a front wall, opposing side walls, roof member, floor member, and rear wall are formed from sheet material and joined together along mating edges to form the housing.

10. The copolymer ambulance housing of claim 1 wherein the collective strength of the ambulance components can resist testing forces equal to a 2.5 times curb weight.

11. An ambulance comprising:
a vehicle including a cab portion and an attached rear chassis;
a copolymer ambulance housing mounted to the rear chassis comprising:
a compartment structure formed from poly sheeting and comprising a front wall, opposing side walls, a roof member, a floor member, and a rear wall, all collectively adhered together forming a unitized and interconnected copolymer structure;
a mounting assembly attached to and forming a portion of an underside of the compartment structure connected to the rear chassis;
a multi-compartment assembly mounted directly to an inside surface of at least one of the opposing side walls;
paramedic seating integrally formed with an inside surface of the compartment structure opposite the multi-compartment assembly;
the floor member, the roof member, the opposing side walls, the rear wall, the front wall and any internal framing having a collective static strength to resist forces equal to a 2.5 times curb weight.

12. The ambulance as in claim 11 wherein the compartment structure is reinforced by use of an internal frame mounted thereto.

* * * * *